Nov. 16, 1971     D. CIABANI     3,619,863
APPARATUS FOR, PRODUCING TUBE PORTIONS OF
NON-CIRCULAR CROSS-SECTION
Filed Aug. 14, 1969     3 Sheets-Sheet 1

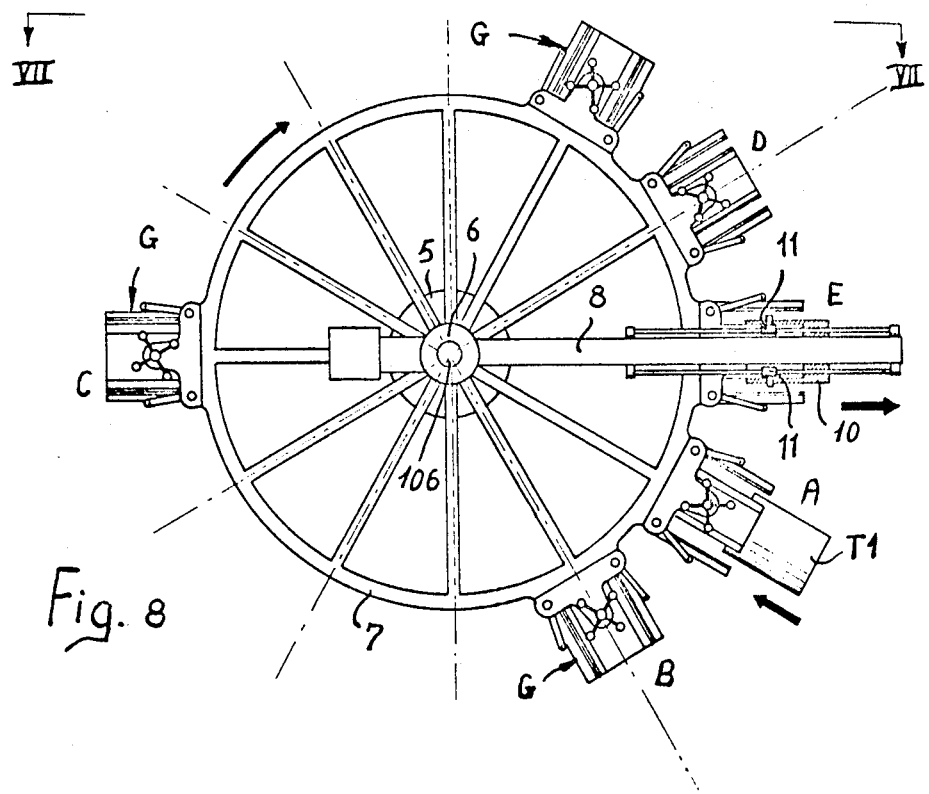
Fig. 8
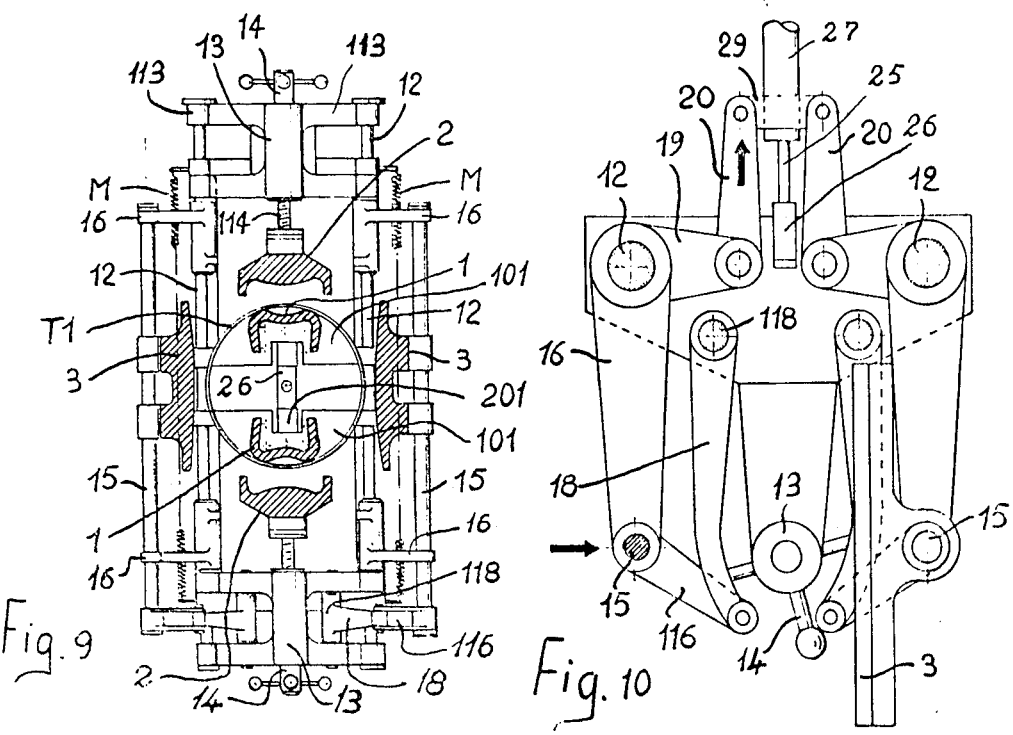
Fig. 9
Fig. 10

Nov. 16, 1971 D. CIABANI 3,619,863
APPARATUS FOR, PRODUCING TUBE PORTIONS OF
NON-CIRCULAR CROSS-SECTION
Filed Aug. 14, 1969 3 Sheets-Sheet 3

United States Patent Office 3,619,863
Patented Nov. 16, 1971

3,619,863
APPARATUS FOR PRODUCING TUBE PORTIONS OF NON-CIRCULAR CROSS-SECTION
Dina Ciabani, 3 Via Donatello, Parma, Italy
Filed Aug. 14, 1969, Ser. No. 850,097
Claims priority, application Italy, Aug. 23, 1968,
7,264/68, Patent 841,636
Int. Cl. B29c 17/02
U.S. Cl. 18—19 TM                                          8 Claims

ABSTRACT OF THE DISCLOSURE

A tube portion of non-circular cross-section, and of thermoplastic material, is produced by shaping a pre-fabricated tube portion of circular cross-section. The shaping takes place under the action of heat, using stretching and pressing co-operating mould parts. During shaping the sides of the tube portion are curved inwardly so that they are caused to assume plane form by cooling and shrinking.

BACKGROUND OF THE INVENTION

Field of the invention

This invention relates to a method of an apparatus for producing tube portions of non-circular cross-section, for example rectangular or polygonal cross-section, for example rectangular or polygonal cross-section, from thermoplastic material, and in particular from helically wound cardboard strip with a thermoplastic binder.

Description of the prior art

In the manufacture of packaging containers, particularly of can or drum-shaped containers, for example for washing agents, it is known to use as the body of the container a tube portion having a bottom and lid. For this purpose, tube portions of circular or rectangular or polygonal cross-section are used which consist of heat-workable material, particularly thermoplastic synthetic material or helically wound overlapping cardboard strips with a thermoplastic binder. The tube portions which consist of thermoplastic synthetic material are generally extruded, and the tube portions made from helically wound cardboard strips are obtained by winding such strips around a corresponding core.

Production of tube portions of circular cross-section does not present any special difficulty, even for large diameter tubes. In contrast, the direct production of tube portions of noncircular, i.e. rectangular or polygonal cross-section, whether by extrusion or by the winding process presents considerable practical difficulties. On the other hand, tube portions of rectangular cross-section, or containers made therefrom, do have the advantage over tube portions or containers of circular cross-section that they virtually completely fill, and thus make better use of, a given storage space.

SUMMARY OF THE INVENTION

An object of the invention is to eliminate the disadvantages of known methods for producing tube portions of rectangular or polygonal cross-section from thermoplastic material, particularly from helically wound cardboard strip with a thermoplastic binder, and to provide an economical and readily carried out method for producing such tube portions.

According to the invention, a pre-fabricated tube portion of circular cross-section is shaped under the influence of heat to produce a tube portion of rectangular or polygonal cross-section. The method according to the invention is therefore based on a commercial quality tube portion of circular cross-section made from thermoplastic material, particularly from helically wound cardboard strip with a thermoplastic binder, which is subsequently, and under the effect of heat, shaped into a tube portion of non-circular cross-section. The starting tube portion of circular cross-section can be produced without difficulty by conventional extrusion or winding methods, while the subsequent shaping thereof into a tube portion of non-circular cross-section can likewise be implemented without undue difficulty.

Tube portions of accurate and regular rectangular or polygonal cross-sectional form can, in a further development of the invention, be obtained in that, during shaping under heat, the individual sides of the tube cross-section are made so far inwardly concave that after cooling and shrinkage they assume a straight or plane form. This is particularly important in the case of tube portions or packaging containers or relatively large cross-sectional area.

For production of the most used tube portions of rectangular cross-section, the invention provides for the tube portion of circular cross-section to be stretched in a transverse direction into a pipe portion of rectangular cross-section, of which the sides extending transversely to the direction of stretching are made internally concave during or immediately after the stretching while the other two sides on the other hand, which extend parallel with the direction of stretching, are only subsequently made concave. By this sequence of shaping steps, it is ensured that the sides of the tube cross-section which extend parallel with the direction of stretching are not influenced by other shaping forces during stretching.

For carrying out the method, the invention provides an apparatus which consists of two heated expansion jaws which engage in the tube portion of circular cross-section which is to be worked, and which are adapted to move in opposite directions away from and towards each other, and of two outer heated presser jaws which are adapted to move towards and away from each other in opposite directions and transversely thereto. Preferably, the expander jaws each co-operate with a corresponding outer fixed and likewise heated mould part. The co-operating faces of the expander jaws and the associated outer mould parts, as well as the faces of the presser jaws which are towards the tube portion exhibit a curvature directed towards the inside of the tube portion.

This shaping apparatus has associated with it an actuating device which, after the tube portion which is to be shaped has been pushed on to the retracted expander jaws, moves these latter apart until they abut on the associated fixed mould parts and then closes the presser jaws on to the tube portion shaper by the expander jaws.

The effect of this subsequent closure movement of the outer presser jaws is that the tube portion of circular cross-section which has been placed on the retracted expander jaws and which is to be worked, centres automatically on the expander jaws as these move apart from each other, without being hampered thereby by the presser jaws.

According to a preferred embodiment of the invention, a plurality of shaping devices each exhibiting a set of presser jaws, expander jaws, mould parts associated with these, and an actuating device are mounted at regular intervals on an intermittently rotating turntable and pass seriatim through an insertion station for fitment of the tube portion which is to be shaped on to the retracted expander jaws, a shaping station for pressing the expander jaws apart and closing the presser jaws, at least one station for gripping the tube portion in the shaped condition, a removal station for opening the presser jaws and retracting the expander jaws, and a depositing station for extraction of the completely shaped tube portion from the retracted expander jaws.

BRIEF DESCRIPTION OF THE DRAWINGS

FIG. 8 is a digrammatic top plan of the machine;

FIG. 9 is a front elevation of a single shaping device of the machine;

FIG. 10 is a diagrammatic plan view of the device according to FIG. 9, with some of the component parts omitted;

FIG. 2 shows a tube portion T2 of rectangular cross-section which is intended particularly for the production of can or drum-shaped packaging containers and which consists of helically wound overlappng cardboard strips with thermoplastic binder. This tube portion T2 is obtained from a corresponding, i.e. similarly constructed tube portion T1 shown in FIG. 1, having a circular cross-section, by shaping under heat. For this purpose, a shaping device is used which consists of two heated expander jaws 1 adapted to move away from and towards each other in opposite directions, and two heated presser jaws 3 adapted to move in opposite directions towards and away from each other and in a transverse direction thereto, as is illustrated diagrammatically in FIGS. 3 to 6. The expander jaws 1 co-operate with associated fixed and similarly heated mould parts 2. The expander jaws 1, the associated mould parts 2 and the presser jaws 3 may be heated by incorporated heating resistances, not shown. The co-operating faces of the expander jaws 1 and of the associated mould parts 2 are curved inwardly, i.e. towards the middle of the device. The inwardly, i.e. towards the expander jaws 1, directed faces of the presser jaws 3 are likewise convex.

Figure 1:
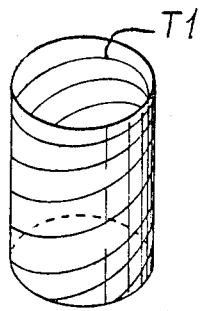
FIG. 1 is a perspective view of a commercial quality tube portion of circular cross-section made from helically wound cardboard strip with thermoplastic binder.
Figure 3:
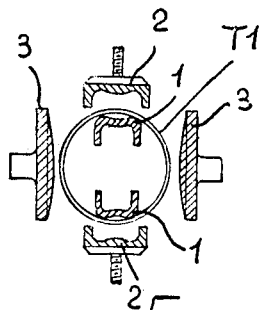
FIGS. 3 to 6 are diagrammatic cross-sections of successive stages of the method of the invention for producing the tube portion of FIG. 2 from the tube portion of FIG. 1.
Figure 4:
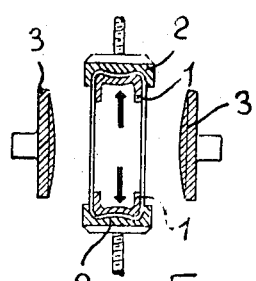
Figure 2:
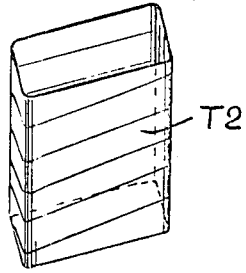
FIG. 2 is a perspective view of a tube portion of non-circular, that is rectangular, cross-section obtained in accordance with the invention from the tube portion of FIG. 1.

The tube portion T1 of circular cross-section, which is to be shaped, is pushed onto the pair of expander jaws 1—1 between the associated mould parts 2 and presser jaws 3 while the expander jaws 1 are retracted and the presser jaws 3 are open, as is shown particularly in FIG. 3. The expander jaws 1 are then moved apart from each other until they bear against the associated fixed mould parts 2, as is shown in FIG. 4. Thus, the tube portion T1 of circular cross-section, by virtue of the inner expansion, becomes stretched into a tube portion of rectangular cross-section. During this shaping of the tube portion, the latter centres itself automatically on the expander jaws 1, since the cross-section sides which extend parellel with the direction of stretching are not affected or retarded by the still open presser jaws 3 and can in consequence stretch or move without hindrance. At the end of stretching of the tube cross-section, the sides of the tube portion which extend transversely to the direction of movement of the expander jaws 1 are pressed between the expander jaws 1 and the associated outer mould parts 2 and become thereby curved towards the interior of the tube portion.

Figure 5:
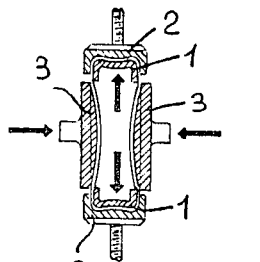
Figure 6:
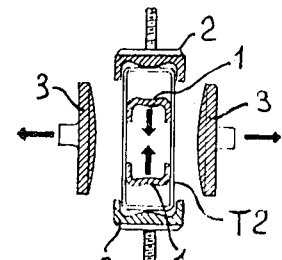
Figure 7:
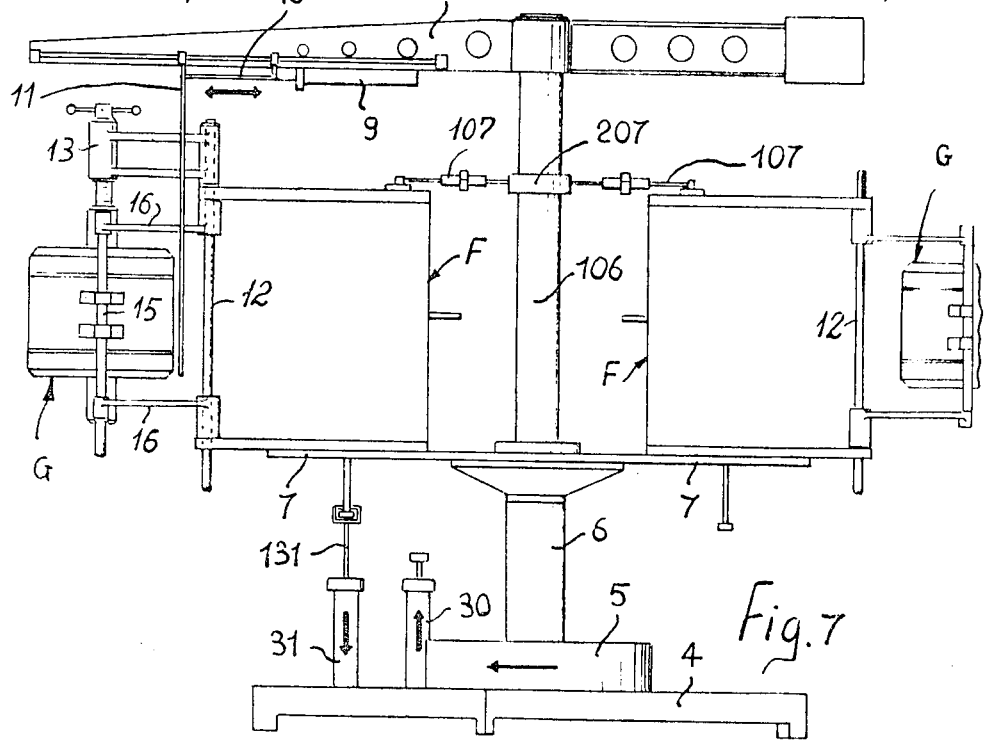
FIG. 7 is the diagrammatic side elevation of a machine for carrying out the method of the invention as seen from the line VII—VII of FIG. 8.

The lateral presser jaws 3 are then closed onto the tube portion stretched by the expander jaws 1 and held firmly on the outer mould parts 2, in fact sufficiently far that they somewhat impress and make inwardly concave the associated sides of the tube cross-section, as is shown in FIG. 5. The shaped tube portion is held firmly in this state for some time and subjected to heat treatment by the heated expander and presser jaws 1, 3 as well as by the heated mould parts 2. The presser jaws 3 are then opened and the expander jaws 1 retracted, as shown in FIG. 6. The now lastingly shaped tube portion T2 of rectangular cross-section can be taken off the retracted expander jaws 1, the inwardly concave tube cross-section faces shrinking during cooling and assuming a straight, i.e. plane, form.

A machine for the series production of tube portions of rectangular cross-section from helically wound cardboard strips with thermoplastic binder according to the method described is illustrated diagrammatically in FIGS. 7 to 13. This machine consists of a base frame 4, which carries a fixed middle column 106. Mounted pivotally on the bottom part of the column 106 is a bush 6 supporting a horizontal turnable 7. The bush 6 and the turnable 7 run intermittently about the fixed column 106 and are driven by a bottom drive device 5.

Secured at regular angular distances on the turnable 7 are a plurality of in themselves identical shaping devices G, each with an associated actuating device F and in addition connected by upper radial tension members 107 to a collar 207 mounted rotatably on the column 106.

Each shaping device G comprises two horizontal superimposed expander jaws 1 which extend in a radial direction in relation to the turntable 7 and have an approximately U-shaped cross-section with concave outer, i.e. upper or lower face. The expander jaws 1 are each secured projectingly on a carriage 101 adapted to slide in a vertical direction. The two carriages 101 are connected by traction springs M and are drawn towards each other by these springs M. Disposed between the two carriages 101 is a wedge-shaped expander member 206 which is adapted for to-and-fro displacement in the longitudinal direction of the expander jaws 1, i.e. in a radial direction in relation to the turntable 7. This expander member 26 co-operates with rollers 201 which are mounted on the carriages 101. In the inoperative position of the shaping device G, the expander member 26 is retracted inwardly, i.e. towards the middle column 106 of the machine, as is shown particularly in FIG. 11. The carriages 101 are thereby drawn towards one another by the springs M and the expander jaws 1 consequently assume their retracted position as shown in FIG. 3. If the expander member 26 is, on the other hand, displaced outwardly, i.e. away from the middle column 106, it forces the carriages 101 apart, against the force of the traction spring M. The expander jaws 1 are consequently displaced in opposite directions, i.e. upwardly and downwardly and assume their expanded position as shown in FIGS. 4 and 5.

Above and below each of the expander jaws 1 is an associated mould part 2 of approximately U-shaped cross-section with a convex inner face. Each mould part 2 is mounted to rotate freely on a vertical threaded spindle 114 which is screwed by an appropriate threaded bush 13 and provided on its outer end with a handwheel 14 or the like. The threaded bush 13 is supported through projecting arms 113 by two lateral vertical round bars 12 secured on the turntable 7. The mould parts 2 are nonrotatably guided in respect of the expander jaws 1. For this purpose, each mould part 2 has a vertical guide rod 214 which engages in a freely displaceable manner through corresponding bores provides in the supporting arms 113 of the threaded bush 13, as is shown particularly in FIG. 11. Consequently, by rotating the threaded spindles 114, it is possible to move the mould parts 2 upwardly and downwardly and to adjust their distance from one another or from the associated expander jaws 1 according to the format desired of the cross-section of the tube portion T2 which is to be produced.

Figure 11:
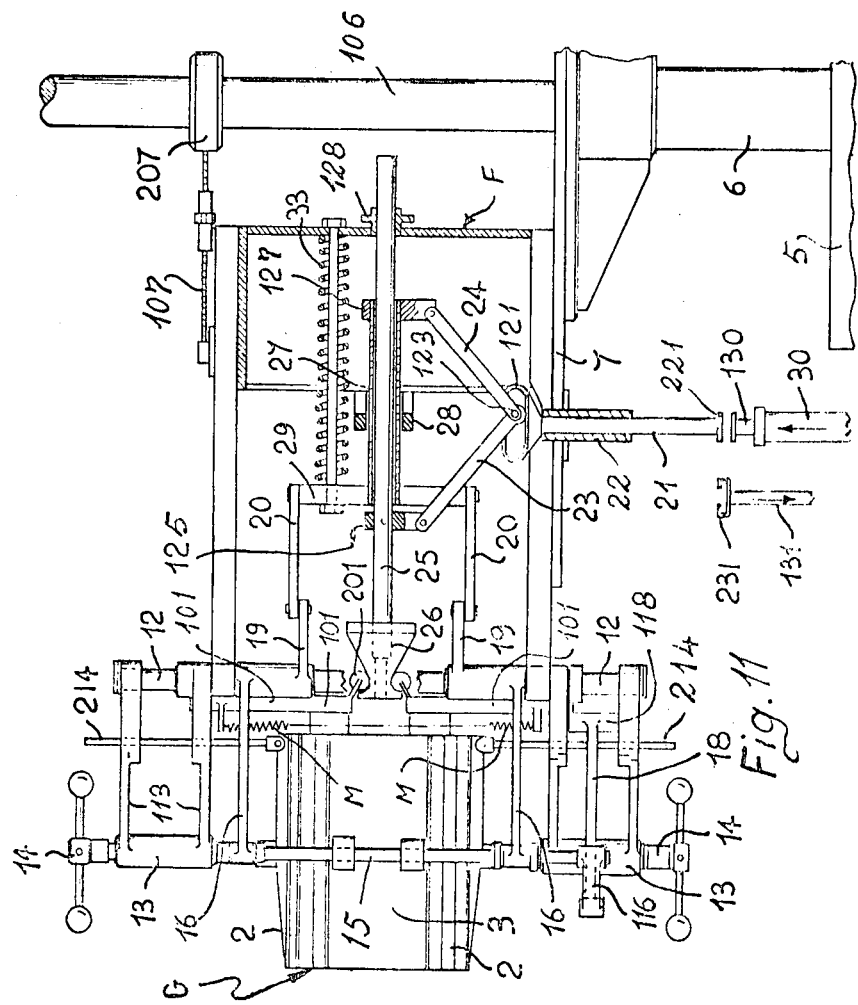
FIG. 11 shows the shaping device and the associated actuating device in a lateral elevation and partially in section.

On each side of the pair of expander jaws 1 is disposed a presser jaw 3 with a convex inner face. Each presser jaw 3 is secured on a vertical round bar 15 which is mounted to pivot freely in an upper and a lower horizontal oscillating arm 16 (FIGS. 9 to 11). These two oscillating arms 16 are pivotally mounted on the associated later round bar 12, each being connected through an angled rear lever arm 19 and an articulating tie piece 20 to a control member 29 common to all oscillating arms 16, i.e. to both presser jaws 3, and adapted to reciprocate in the longitudinal direction of the presser jaws 3, i.e. in a radial direction in relation to the turntable 7. Secured at the bottom end of each rotatable round bar 15 is a lever arm 116 which is articulatingly connected to a link 18 adapted to pivot about the pivot point 118. Thus is formed an articulating parallelogram 16, 116, 18 illustrated particularly in FIG. 10, which, when the oscillating arms 16 pivot, so rotates the round bars 15 with the presser jaws 3 secured thereon, that the presser jaws 3 always retain their position parallel with the expander jaws 1.

The control member 29 is pressed by a thrust spring 33 outwardly into an inoperative position in which the oscillating arms 16 are pivoted outwardly and the presser jaws 3 are consequently opened. If, on the other hand, the control member 29 is displaced inwardly against the thrust spring 33, then the oscillating arms 16 are pivoted in and the presser jaws 3 are consequently closed.

Figure 12:
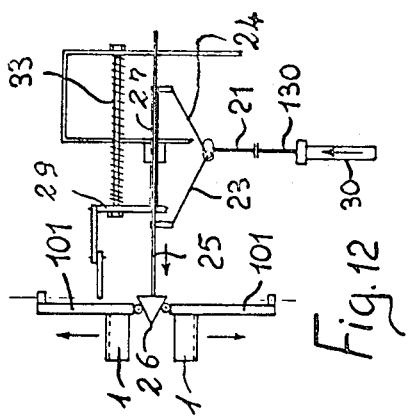
FIGS. 12 and 13 show the mode of operation of the actuating device, in a diagrammatic view.
Figure 13:
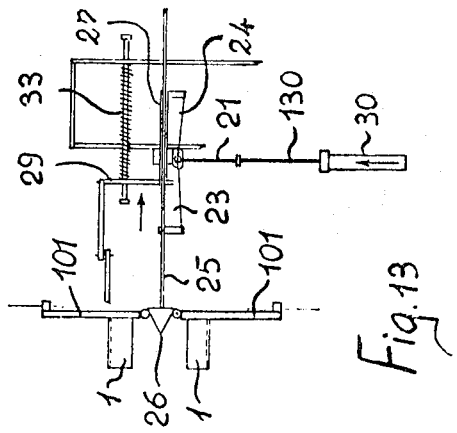

The control member 29 for opening and closing the presser jaws 3 and the expander member 26 for pressing apart and drawing in the expander jaws 1 are moved by the actuating device F associated with each shaping device G and illustrated particularly in FIGS. 11 to 13. The control member 29 is thereby secured on a bush 27 which is displaceably guided in a sliding friction bearing 28. The expander member 26 on the other hand is mounted on a rod 25 which is guided for displacement in the bush 27 and in a sliding friction bearing 128. One end 127 of the bush 27 is articulatingly connected to one lever arm 24 of a bent lever assembly 23, 24, 123. The other lever arm 23 of this bent lever assembly is articulated on a collar 125 mounted on the rod 25. The joint 123 of the bent lever assembly engages with the upper head end 121 of a vertical actuating push rod 21 situated beneath it and adapted to slide in a sliding guide 22 transversely to the rod 25 and to the bush 27. The head end 121 of the actuating push rod 21 has, extending parallel with the rod 25 and the bush 27, an elongated hole in which the joint 123 of the bent lever assembly is displaceably guided. The lower end of the actuating rod 21 which hangs freely downwardly from the turntable 7 is provided with a widen foot part 221.

In the inoperative position of the device as shown in FIG. 11, with retracted expander jaws 1 and opened presser jaws 3, i.e. when the expander member 26 is retracted inwardly and the control member 29 is pressed outwardly, the bent lever assembly 23, 24 is bent downwardly and the actuating push rod 21 assumes its lowest basic position. If the actuating push rod 21 is then lifted together with the joint 123 of the bent lever assembly, then the bent lever members 23, 24 are stretched. When this happens, the bush 27 with the control member 29 on the one hand and the rod 25 with the expander member 26 on the other are displaced in opposite directions, i.e. the bush 27 rightwards in FIG. 11 in the direction of closure of the presser jaws 3, and the rod 25 leftwards in the direction of opening the expander jaws 1. The thrust spring 33 acting on the control member 29 is however so dimensioned that the displacement of the bush 27 which takes place against the force of this spring must overcome a greater resistance than the oppositely directed displacement of the rod 25. Consequently, when the actuating push rod 21 is lifted, first the bent lever assembly joint 123 is moved leftwards in the elongated hole in the push rod head 121 and only the rod 25 with the expander member 26 is displaced forwards via the lever arm 23, as is shown particularly in FIG. 12. Then, once the joint 123 has reached the left-hand end of the elongated hole in the push rod head 121, then simultaneously with the further forward displacement of the rod 25, also the bush 27 with the control member 29 is retracted via the lever arm 24 and against the force of the thrust spring 33. The joint 123 again moves rightwardly in the elongated hole in the push rod head 121. The displacement of the rod 25 with the expander member 26 therefore to a certain extent anticipates the adjustment of the bush 27 with the control member 29. Consequently, first the expander jaws 1 must be moved fully apart and pressed against the associated mould parts 2 and only then are the presser jaw 3 completely closed and pressed against the associated sides of the tube portion, as has already been described in connection with FIGS. 4 and 5.

The lifting movement of the actuating push rod 21 is continued until the levers 23, 24 somewhat exceed their fully stretched dead centre position and the joint 123 is applied against an abutment, e.g. against the sliding friction bearing 28 of the bush 27, as is shown particularly in FIG. 13. The lever arms 23, 24 are automatically fixed in this position under the action of the thrust spring 33, so that the presser jaws 3 retain their closed position and the expander jaws 1 retain their opened position even when the force lifting the actuating push rod 21 ceases, i.e. the push rod is released. The shaping device G is returned to its starting position by the actuating push rod 21 being drawn downwardly, in fact at least sufficiently far for the bent lever assembly 23, 24 to pass downwardly beyond its fully extended dead centre position. At this stage, first the joint 123 under the action of the thrust spring 33 is again displaced leftwards in the elongated hole of the push rod head 121 and the bush 27 is pushed forward with the control member 29. Retraction of the rod 25 with the expander member 26 starts somewhat later. In consequence, now, first the presser jaws 3 are partly opened, i.e. lifted off the shaped tube portion, and only then are the expander jaws 1 retracted.

By reason of the intermittent movement of the turntable 7, the individual shaping devices G with the associated actuating devices F pass one after another through the following working stations shown diagrammatically in FIG. 8: in insertion station A in which the tube portion T1 of circular cross-section which is to be worked is pushed on to the retracted expander jaws 1; a shaping station B, in which the actuating push rod 21 is raised and in consequence the expander jaws 1 are pressed apart and the presser jaws 3 are closed; one or preferably more stations C in which the tube portion is held fast in the shaped state under the action of heat in the device G; a removal-from-mould station D, in which the actuating push rod 21 is drawn downwardly resulting in the presser jaws 3 being opened and the expander jaws being retracted; a depositing station E in which the completely shaped tube portion T2 of rectangular cross-section is drawn off the retracted expander jaws 1.

The actuating push rod 21 is lifted at the shaping station B by means of a pneumatic or hydraulic cylinder 30 which is rigidly disposed on the base frame 4 of the machine, underneath the turntable 7, having piston 130 co-operating with the actuating push rod 21 and raised and lowered in cadence after each forward feed step of the turntable 7.

In the removal-from-mould station D, the actuating push rod 21 is drawn downwards by means of a further hydraulic or pneumatic cylinder 31 disposed rigidly on the base frame 4 underneath the turntable 7. The piston 131 of this cylinder 31 bears on its outer upper end a profiled gripper head 231 (FIG. 11) which is open at both ends and into which runs the widened foot end 221 of the actuating push rod 21 after the forward feed step of the turntable 7. The piston 131 of the cylinder 31 is then lowered and raised again shortly after commencement of the next forward feed step, i.e. after the foot part 221 of the actuating push rod 21 has run out of the gripper head 231.

Disposed in the depositing station E is an ejector device for drawing the completely shaped tube portion T2 off the retracted expander jaws 1. This ejector device consists of a radial support arm 8 mounted on the top end of the fixed middle column 106. Longitudinally displaceably mounted on the support arm 8 is a carriage 10 which is adapted for reciprocating movement by a hydraulic or pneumatic cylinder 9 and which carries two wiper strips 11 which extend downwardly on both sides of the pair of expander jaws 1–1 of the shaping device G and engage behind the completed tube portion T2 which is to be ejected.

It goes without saying that the invention is not limited to the embodiment illustrated; instead, within the framework of the general idea behind the invention, a plurality of solutions which may differ particularly in their construction, are possible. For example, it is possible by means of the method of the invention or by using the apparatus of the invention, to produce not only tube portions of rectangular or polygonal cross-section from helically wound cardboard strip, but also to produce them from any other heat-workable materials, particularly from thermoplastic synthetic materials. On the other hand, all the features which arise from the description and the drawings, inclusive of the structural details, may be essential to the invention when used in any desired combination.

What I claim is:

1. Apparatus for producing tube portions of non-circular cross section from prefabricated thermoplastic tubular portions of circular cross section said apparatus comprising:
    a pair of diametrically disposed expander jaws positioned within a thermoplastic tubular portion of circular cross section;
    means for reciprocating the expander jaws so that when the expander jaws are moved apart from each other the circular tubular portion is formed into a tube of elongated non-circular cross section;
    a pair of diametrically disposed heated presser jaws positioned transversely to the pair of expander jaws, said presser jaws being on the outside of the tubular portion; and
    means for reciprocating the presser jaws so that when the presser jaws are moved toward each other they will engage the tubular portion and press the engaged portions inwardly.

2. Apparatus according to claim 1, wherein each expander jaw co-operates with a respective outer fixed and heated mould part.

3. Apparatus according to claim 2, wherein the co-operating faces of the expander jaws and of the outer mould parts, and also those faces of the outer presser jaws which are directed towards the tube portion, have a curvature directed towards the interior of the tube portion.

4. Apparatus according to claim 2 and wherein actuating means are provided which serially actuate the means for reciprocating the expander jaws and then actuate the means for reciprocating the presser jaws.

5. Apparatus according to claim 1 and wherein the means for reciprocating the expander jaws comprises two reciprocating moving carriages mounting the pair of expander jaws, spring means for moving the carriages toward each other, and a wedge shaped member reciprocally mounted to engage and force the carriages away from each other.

6. Apparatus according to claim 1 and wherein the means for reciprocating the presser jaws comprises oscillating levers mounting the presser jaws, and a displaceable control member operatively connected to the oscillating evers to oscillate the levers.

7. Apparatus according to claim 6, wherein the said control member is mounted on a bush displaceable in the longitudinal direction of the tube portion while an expander member for actuating the expander jaws is mounted on a rod adapted for longitudinal displacement in this bush, the bush and the rod being each connected to a respective arm of a bent lever assembly, of which the joint engages for displacement parallel with the rod and with the bush in an actuting member movable transversely and reciprocatingly in relation thereto, the bush and the control member being pressed by spring means toward a position corresponding to the open state of the pressure jaws.

8. Apparatus according to claim 7, wherein the lever assembly is securable in substantially extended dead centre position corresponding to the closed position of the presser jaws and the expanded position of the expander jaws by passing a short distance beyond the dead centre position and bearing against a stop by the spring means.

References Cited

UNITED STATES PATENTS 3,290,198   12/1966   Lux et al. _____ 156—580 X

FOREIGN PATENTS 1,301,155   7/1962   France _____ 264—320

ROBERT D. BALDWIN, Primary Examiner

N. E. LEHRER, Assistant Examiner

U.S. Cl. X.R.

93—94 PX; 264—320; 18—DIG 41